Dec. 25, 1923.
D. M. WINANS
1,478,689
ADJUSTABLE MIRROR FOR WINDSHIELDS
Filed Dec. 9, 1920
2 Sheets-Sheet 1
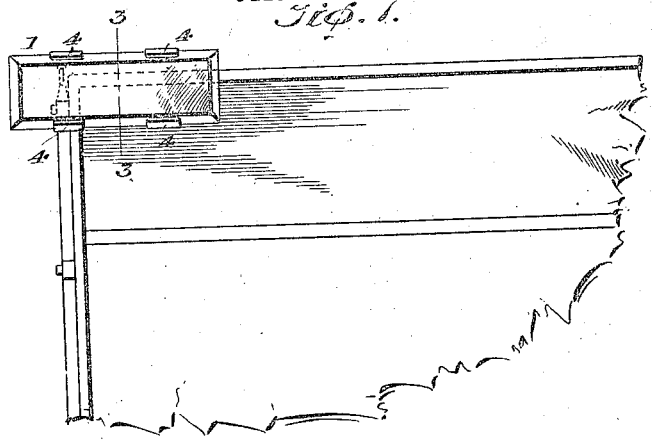
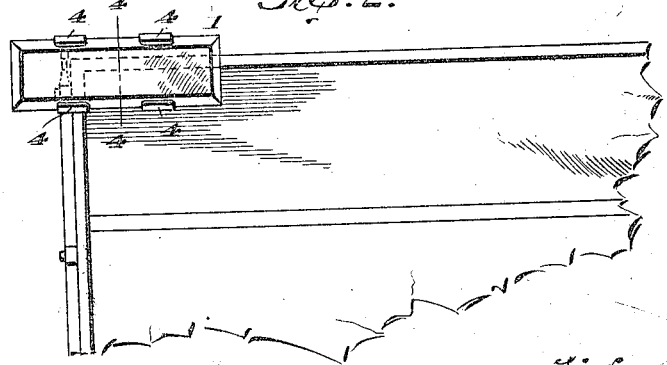
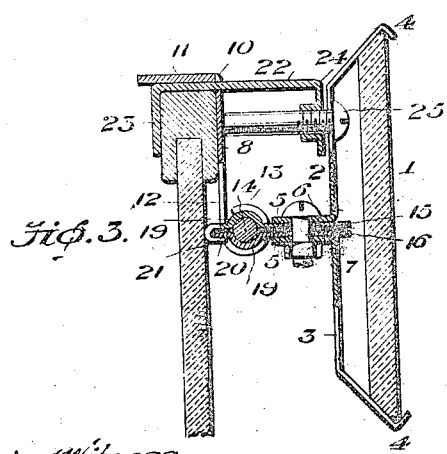
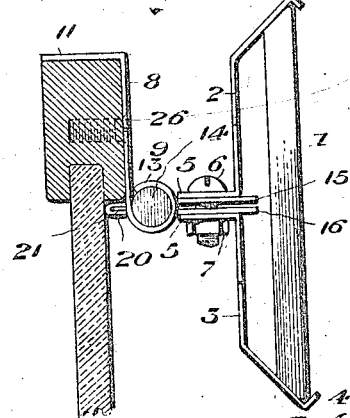
Witness
Inventor
Daniel M. Winans
by his Attorney Dec. 25, 1923.                                           1,478,689
                     D. M. WINANS
            ADJUSTABLE MIRROR FOR WINDSHIELDS
               Filed Dec. 9, 1920              2 Sheets-Sheet 2

Witness                                    Inventor
                                      Daniel M. Winans
                                    by Geo. N. Shuller
                                              his Attorney Patented Dec. 25, 1923.

1,478,689

UNITED STATES PATENT OFFICE.

DANIEL M. WINANS, OF BINGHAMTON, NEW YORK, ASSIGNOR TO THE BREWER-TITCHENER CORPORATION, OF BINGHAMTON, NEW YORK, A CORPORATION OF NEW YORK.

ADJUSTABLE MIRROR FOR WINDSHIELDS.

Application filed December 9, 1922. Serial No. 605,873.

*To all whom it may concern:*

Be it known that I, DANIEL M. WINANS, a citizen of the United States, residing at Binghamton, in the county of Broome and State of New York, have invented certain new and useful Improvements in Adjustable Mirrors for Windshields, of which the following is a specification.

This invention relates to an adjustable mirror for windshields for the purpose of giving the driver of the car a view of conditions at the rear of his car.

My invention is adapted for attachment to the upper edge of the windshield, as distinguished from the common practice of attachment of the mirror to the supporting frame for the windshield, and I thus enable the device to be conveniently arranged, out of the way and yet in proper position to afford proper vision, beside dispensing with the usual long arm or bracket with its excessive vibration.

My object is the provision of a novel clamp or bracket which is adapted to secure the device to any size or shape of windshield or windshield edge frame and is also designed for its securement to the wooden frame used on enclosed cars, said clamp being also combined in a novel manner with the remaining parts of the mirror support and adapted to occupy only a slight space above the windshield.

The invention is susceptible of modification and the disclosure given is illustrative, instead of restrictive, of the scope thereof.

In the accompanying drawings—

Figure 1 is an elevation showing the mirror applied to a windshield such as is used on open cars;
Fig. 2 is a similar view showing the mirror applied to the wooden frame of a closed car;

Fig. 3 is a vertical section on line 3—3, Fig. 1;
Fig. 4 is a vertical section on line 4—4, Fig. 2;

Figure 5:
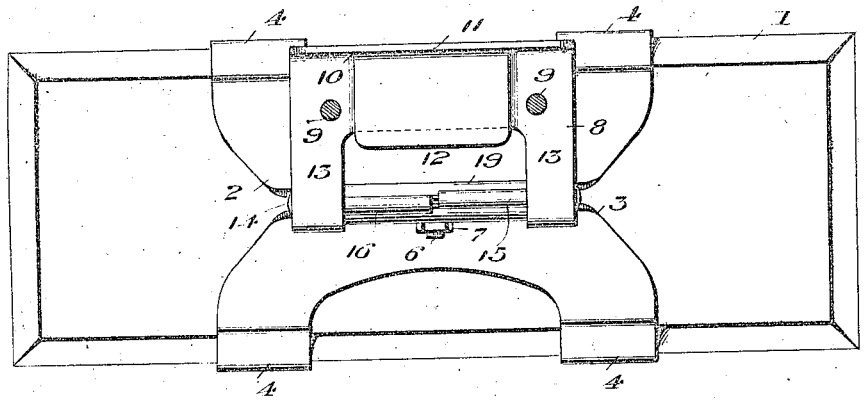
Fig. 5 is a rear view of the mirror and attaching means.
Figure 6:
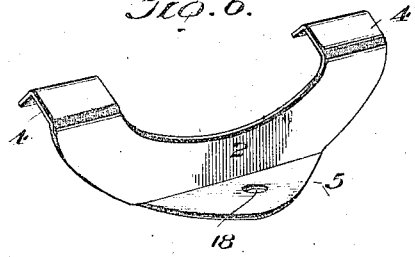
Fig. 6 is a detail perspective of one of the spring fingers.
Figure 7:
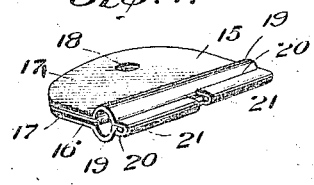
Fig. 7 is a similar view of the tension plates.
Figure 8:
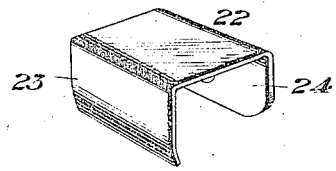
Fig. 8 is a similar view of the clamp yoke.

The mirror which appears at 1, is carried by a support comprising duplicate spring fingers or plates 2, 3 which have clips 4 engaging the edges of the mirror. The spring fingers or plates have ears or flanges 5 arranged angularly to them. The formation of the spring fingers or plates 2, 3 is such that they are spaced from the back of the mirror 1 so that the latter is solely held by the clips 4 and hence any vibration of the car will be absorbed by the springiness of the fingers or plates, without injury to the mirror.
Passing through the ears or flanges 5 is a screw 6 provided with nut 7. The screw and nut serve as a pivot for the spring fingers or plates 2, 3 and for drawing them firmly against the upper and lower edges of the mirror where the clips 4 engage the latter. The mirror is thus mounted to be tilted in a horizontal plane.

A clamp plate 8 which has screw holes 9, a horizontal slot 10 and a horizontal flange 11, is cut out at 12 and provided with parts 13 which are securely and tightly bent around the ends of a pintle 14. The pintle 14 serves as a mounting for duplicate tension plates 15, 16 which have flanges 17 disposed between the ears or flanges 5 and having holes 18 registering with corresponding holes in the said flanges 5 and receiving the tension and pivot screw 6.

The tension plates 15, 16 have curved or bowed parts 19 which embrace the pintle 14 and each of them is provided with a re-bent lip 20 and a straight edge 21. The re-bent lip 20 of each tension plate receives the straight edge 21 of the other tension plate.
The tension plates are thus hinged together, as it were, without requiring a hinge pivot or pintle, and the engagement of the parts 20, 21 enables the flanges 17 to be pressed or clamped together between the ears or flanges 5 by the screw 6. The tension thus imparted to the plates 15, 16 causes them to frictionally grasp the pintle 14 so that there is provided a secure friction joint which enables the mirror to be tilted on a horizontal axis so that it can be disposed at an angle to suit the driver of the car.

A clamp yoke 22 is received in the slot 10 and has its top lying under and against the flange 11. Said yoke has a flange 23 which lies vertically and parallel to the body of the clamp plate 8, and it is also provided with a flange or lip 24 which carries a screw 25 whose tip bears on the clamp plate 8; this screw affords means for adjusting the clamp yoke 22 through the slot 10 to enable the clamp comprising the plate 8 and yoke 22 to firmly grasp the edge of the windshield, or its frame. The screw 25 is of such a length, in connection with the width of the clamp yoke 22 that a wide range of adjustment is possible, enabling the clamp to be applied to any windshield.

When the adjustable mirror is to be applied to the wood frame of an enclosed car, the clamp yoke 22 is removed and the clamp plate 8 is directly attached to the wood frame by screws 26, Fig. 4, passing through the holes 9, as shown in Figs. 4 and 5.

The clamp plate 8 may be arranged horizontally, instead of vertically, if desired, but in either event the pintle 14 will be disposed horizontally.

The plates 2 and 3 are duplicate and interchangeable stampings and so are the tension plates 15, 16. The clamp plate 8 is a stamping to which the pintle 14 is subsequently applied. The clamp yoke 22 is a stamping. It is obvious, therefore, that my invention can be cheaply and easily manufactured and readily assembled.

It will be observed that the clamp plate 8 is only raised above the windshield a distance equal to the thickness of the clamp yoke 22 and the horizontal flange 11 which is a decided advantage as in some cases the automobile top lies close to the windshield.

The arrangement of the clamp yoke 22 under the flange 11 enables the flange 11 to take the reaction of the pressure of the adjusting screw 25. By the use of the tension plates 15, 16 and the manner in which they are held by the screw 6, all adjustments of the mirror are possible without the necessity of loosening or tightening any screw or other part as the joints are friction joints.

What I claim is:

1. In an adjustable mirror for windshields, the combination with a clamp comprising an angled clamp plate having an upright slotted part adapted to be disposed against the inner side of the windshield, and a horizontal flange adapted to overlie the windshield, a horizontally arranged clamp yoke having two flanges, the outer one of which is adapted to engage the outer side of the windshield, said clamp yoke extending through the slotted part of the clamp plate, and a screw carried by the inner flange of said clamp yoke and engaged with the clamp plate, of a mirror holder having an adjustable connection to the upright part of the clamp plate.

2. In an adjustable mirror for windshields, the combination with an angled clamp plate having a slot extending through its angled part, and a channeled clamp yoke slidable through the slot and disposed against and under one part of the angled clamp plate, said clamp yoke having screw means engaged with the clamp plate for adjusting said yoke in relation to the clamp plate, of a mirror holder having an adjustable connection to the clamp plate.

In testimony whereof I affix my signature.

DANIEL M. WINANS.